US006829238B2

United States Patent
Tokuyo et al.

(10) Patent No.: US 6,829,238 B2
(45) Date of Patent: Dec. 7, 2004

(54) IP ROUTER DEVICE HAVING A TCP TERMINATION FUNCTION AND A MEDIUM THEREOF

(75) Inventors: Masanaga Tokuyo, Ebina (JP); Itaru Nakagawa, Kawasaki (JP); Satoru Chikuma, Kawasaki (JP); Nobutsugu Fujino, Kawasaki (JP); Tetsuya Taniguchi, Yokohama (JP); Takanori Hisanaga, Kawasaki (JP); Michiyasu Chikada, Ichikawa (JP); Daisuke Kuwata, Kawasaki (JP)

(73) Assignees: Fujitsu Limited, Kawasaki (JP); NTT Docomo, Inc., Tokyo (JP)

( * ) Notice: Subject to any disclaimer, the term of this patent is extended or adjusted under 35 U.S.C. 154(b) by 836 days.

(21) Appl. No.: 09/788,390
(22) Filed: Feb. 21, 2001
(65) Prior Publication Data
US 2001/0017862 A1 Aug. 30, 2001
(30) Foreign Application Priority Data
Feb. 28, 2000 (JP) ........................................ 2000-051334
(51) Int. Cl.[7] .............................................. H04L 12/56
(52) U.S. Cl. ......................... 370/392; 370/401; 709/238
(58) Field of Search .................................. 370/236, 400, 370/401, 352–356, 389, 392; 709/225, 245, 238

(56) References Cited

U.S. PATENT DOCUMENTS

| 5,941,988 A | | 8/1999 | Bhagwat et al. ............. 713/201 |
| 6,151,628 A | * | 11/2000 | Xu et al. ...................... 709/225 |
| 6,563,793 B1 | * | 5/2003 | Golden et al. ............... 370/236 |

OTHER PUBLICATIONS

Ajay Bakre et al., "I–TCP: Indirect TCP for Mobile Hosts", Proceedings of the International Conference on Distributed Computing Systems, Vancouver, Canada, May 30–Jun. 2, 1995, Los Alamitos, IEEE Comp. Soc. Press, pp. 136–143.

* cited by examiner

Primary Examiner—John Pezzlo
(74) Attorney, Agent, or Firm—Staas & Halsey LLP

(57) ABSTRACT

When a plurality of IP packets to be relayed, which form a TCP connection, pass through a router device, converting units rewrite part of IP address information and port number information within the packets according to a predetermined rule in cooperation with a TCP connection management database. A stream linking unit extracts the information indicating the original connection destination of a TCP connection from the packets, and links two TCP connections with streams. Converting units rewrite part of the IP address information and the port number information within a plurality of packets to form a TCP connection with an original connection destination according to a predetermined rule in cooperation with the management database.

6 Claims, 23 Drawing Sheets

PACKET INFORMATION BEFORE AND AFTER NORMAL IP ROUTER

PACKET INFORMATION BEFORE AND AFTER NORMAL APPLICATION GATEWAY

PACKET INFORMATION BEFORE AND AFTER ROUTER ACCORDING TO PRESENT INVENTION

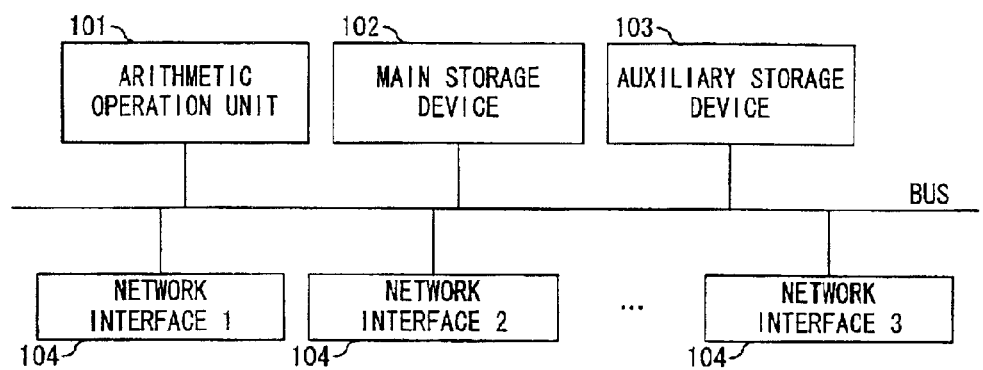
F I G. 1 1

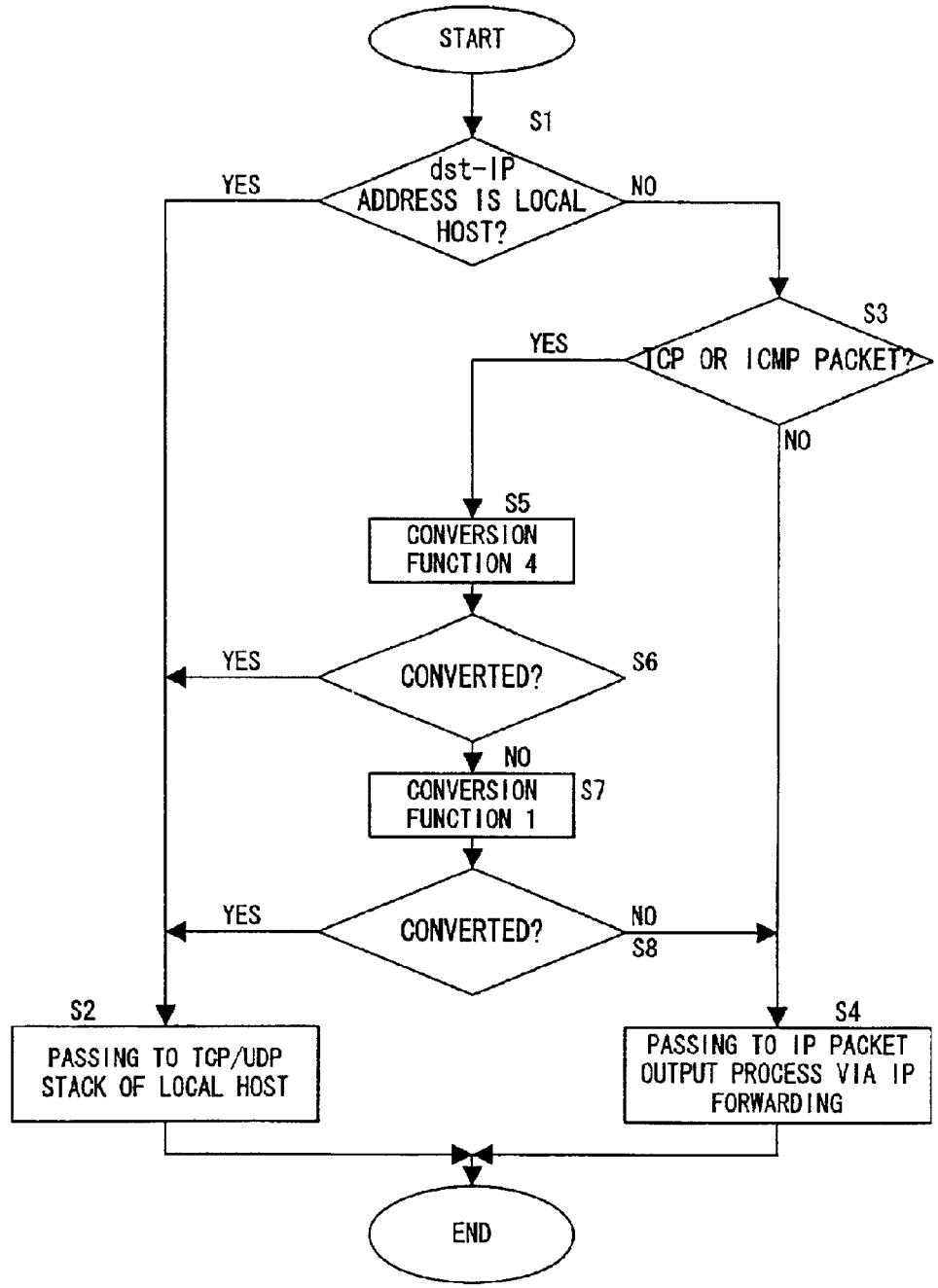
F I G. 14

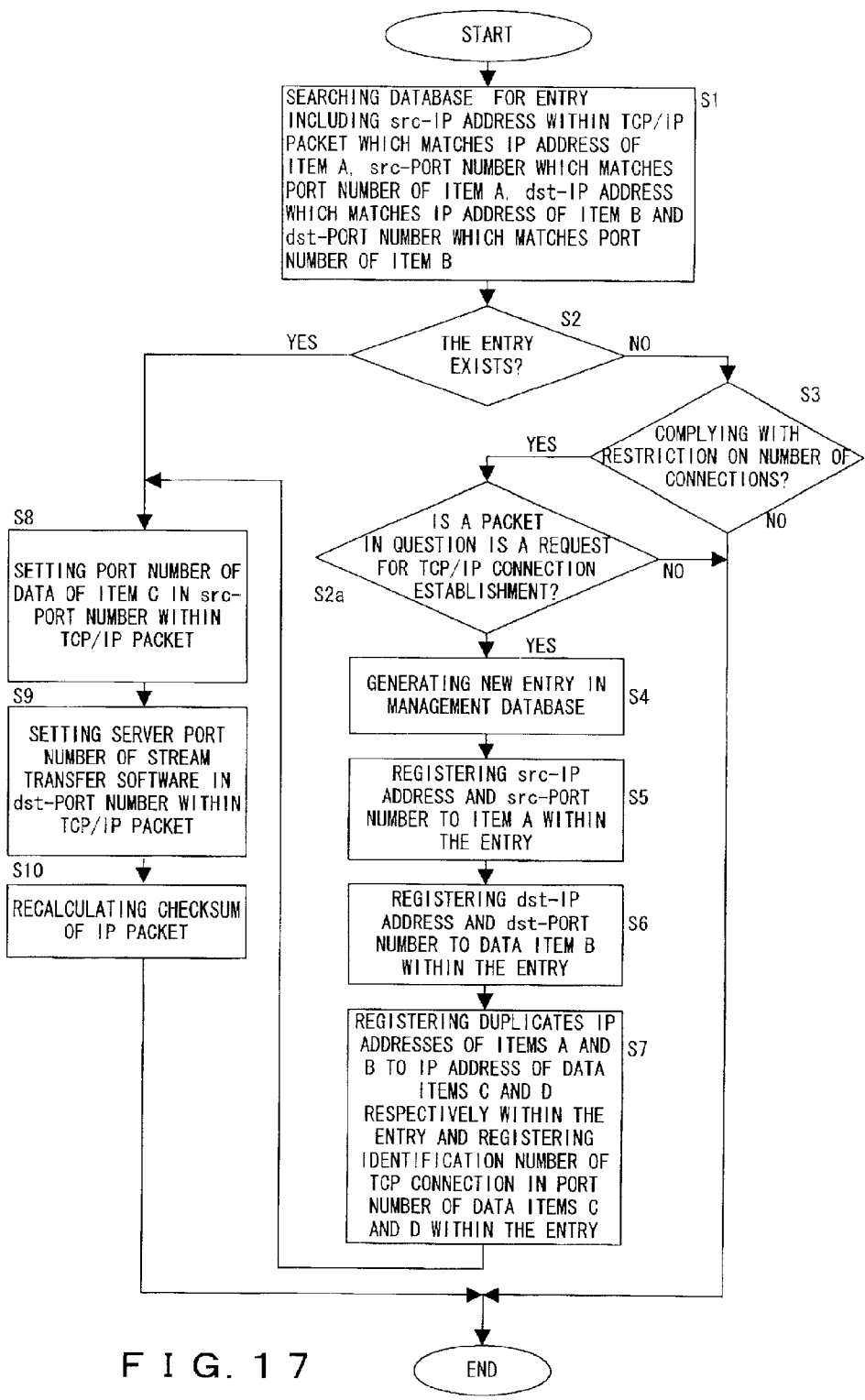
F I G. 17

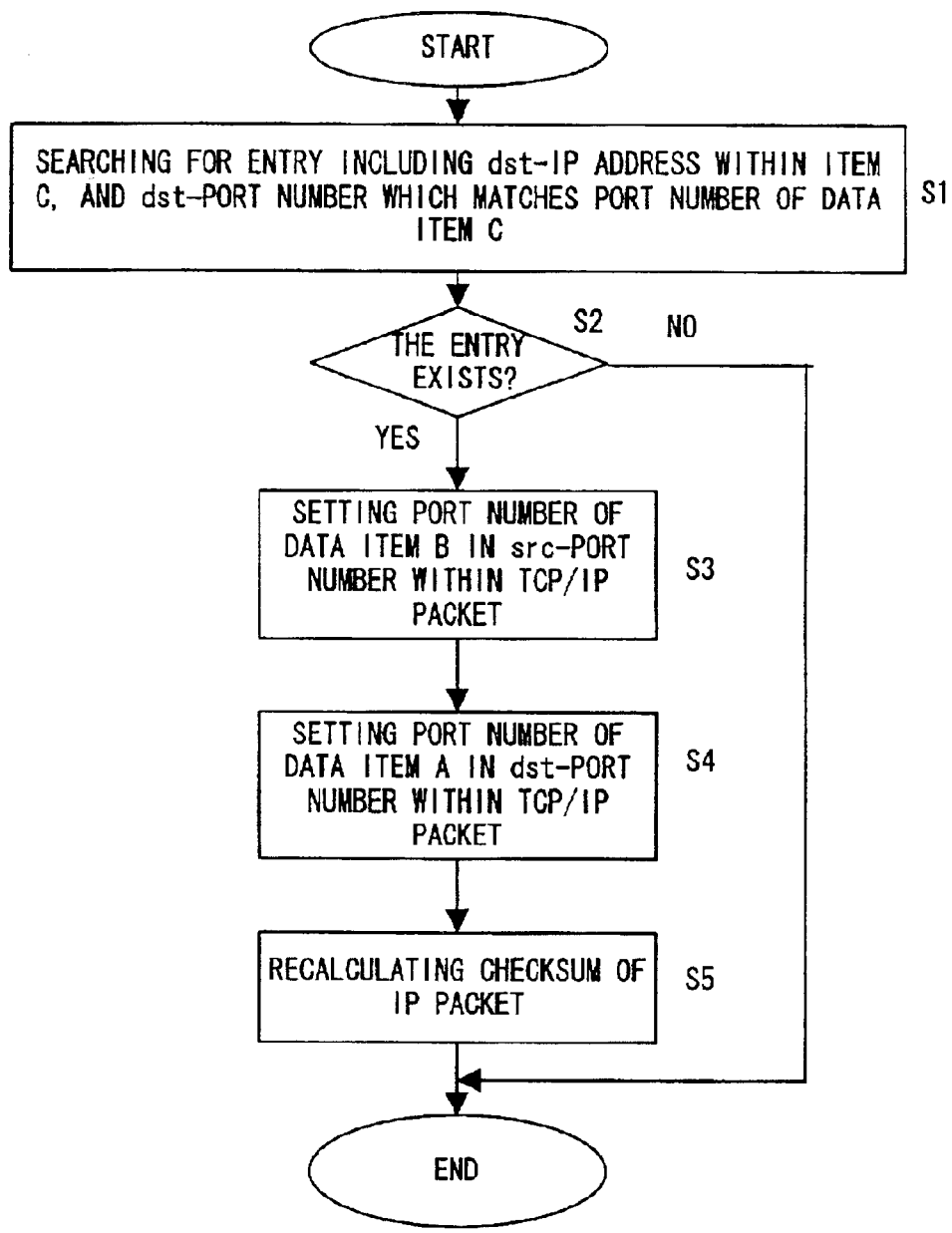
F I G. 18

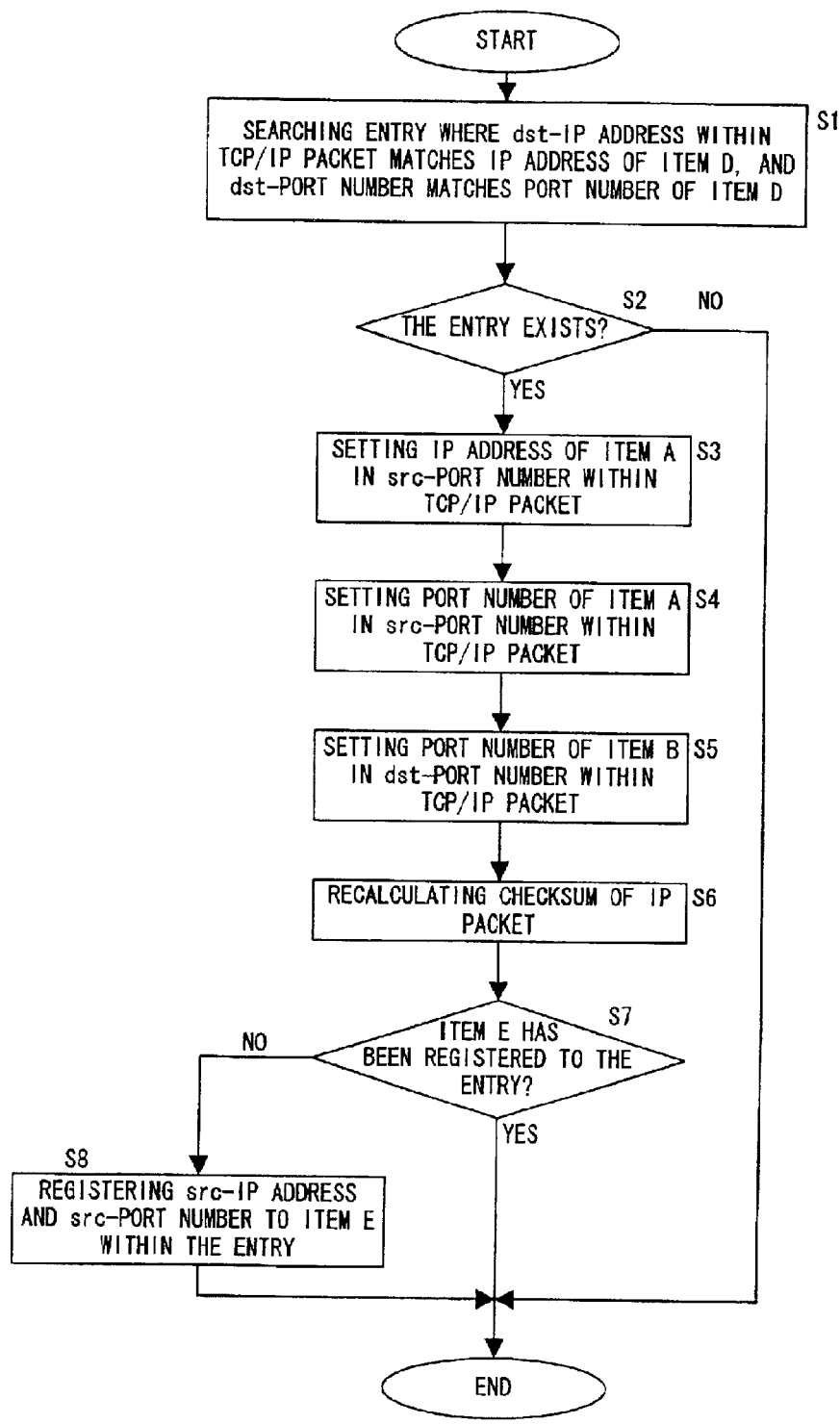
F I G. 19

IP ROUTER DEVICE HAVING A TCP TERMINATION FUNCTION AND A MEDIUM THEREOF

BACKGROUND OF THE INVENTION

1. Field of the Invention

Conventionally, the Internet was configured by wired networks typified by Ethernet. In recent years, however, networks configuring the Internet have been diversified, and an IP network using a cellular phone, a PHS, a wireless packet device, etc. has been widely used. To effectively use a given bandwidth in the Internet including wireless networks, an IP router with which an efficient transmission rate can be obtained in a connection between hosts in the case where networks having different natures such as wired and wireless are linked.

The present invention relates to an IP router device having a function for linking different networks and for terminating a TCP connection relaying IP packets between networks in a computer network based on the Internet Protocol (IP).

2. Description of the Related Art

In a wired network, an IP packet loss or delay occurs mainly due to a congestion within an IP router which links networks. In the meantime, in a wireless network, data that is modulated into radio waves in the physical layer is not properly transmitted by being influenced by a state change caused by radio wave attenuation, interference, blocking by an object, etc. so that an IP packet loss or delay occurs.

Currently, the protocol called TCP (Transmission Control Protocol) is used as a standard for making a reliable data transmission in the Internet.

However, as to TCP, it is known that a congestion occurring within a wired network is recognized as a main cause of a packet loss/delay, and an efficient transmission rate cannot be obtained in a wireless network unless the parameters and algorithms for controlling TCP are optimized for a wireless network.

Considered as a solution to the above described problem is an application gateway which uses control parameters and algorithms, which are respectively suitable for TCP connections, by once terminating TCP connections in the TCP layer and by establishing respective TCP connections for networks of different natures, and provides an efficient transmission rate.

Configuration of a conventional IP router device and that of a conventional TCP terminating device are respectively shown in FIGS. 1 and 2. The IP router device shown in FIG. 1 comprises network drivers 11a and 11b, IP stacks 12a and 12b, and an IP forwarding 16. The IP router passes IP packets between networks as shown in FIG. 1. The header configuration of an IP packet, that of a TCP packet, and that of an ICMP packet are respectively shown in FIGS. 3, 4, and 5.

In the header of the IP packet, src-IP (SOURCE IP ADDRESS) indicating the IP address of a transmission source, and dst-IP (DESTINATION IP ADDRESS) indicating the IP address of a connection destination are described as shown in FIG. 3. In the header of the TCP packet, src-port number (SOURCE PORT) indicating the port number of a transmission source, and dst-port number (DESTINATION PORT) indicating the port number of a connection destination are described as shown in FIG. 4. In the header of the ICMP packet, TYPE (type) and an IP header and first 64 bits of a datagram are described.

The flow of the process for inputting an IP packet, which is performed by the IP stacks 12a and 12b of the above described conventional IP router device, is shown in FIG. 6, whereas the flow of the process for outputting an IP packet, which is performed by the IP stacks 12a and 12b of the IP router device, is shown in FIG. 7. In the input process, the IP stack determines whether or not the dst-IP address of an IP packet is addressed to its local host as shown in FIG. 6. If the IP stack determines that the IP packet is addressed to the local host, it passes the packet to a TCP/UDP stack of its local host. If the IP stack determines that the IP packet is not addressed to the local host, it passes the packet to the output process via the IP forwarding.

Additionally, in the output process, the IP stack searches a routing table with the dst-IP address or its subnetwork, and passes the IP packet to a network driver according to the routing table, as shown in FIG. 7.

Since the IP router device only passes an IP packet between networks as described above, fundamentally, an end host is unconscious of the existence of the router. It is possible to make an IP packet uniquely reach between arbitrary hosts via this router device, and there is no change in the information of the src-IP address and the dst-IP address within the header of the IP packet. Additionally, even if a change occurs in the configuration of a router or the number of routers on an end-to-end path, there is no influence.

Namely, one of the natures of the Internet is that each host has a globally unique IP address, a communication can be made from the host to an arbitrary host, and a communication can be made from the arbitrary host to the corresponding host. This nature is called "end-to-end global connectivity guarantee".

In the meantime, the conventional TCP terminating device (application gateway) is composed of network drivers 11a and 11b, IP stacks 12a and 12b, TCP stacks 13a and 13b, a stream transferring unit 14, and a database 20 for holding connection information.

The flowchart of the stream transfer function of the conventional TCP terminating device (application gateway) is shown in FIG. 8. As shown in this figure, the stream transfer function waits for the link of a TCP connection as a server socket (step S1), and establishes a TCP connection with a client (step S2). Then, the stream transfer function obtains the IP address and the port number of the connection destination from the data within a stream (step S3), and establishes a TCP connection at the connection destination as a client socket (step S4).

Then, the stream transfer function determines whether or not the stream continues (step S5). If the stream does not continue, the process is terminated. If the stream continues, the stream transfer function reads data the amount of which is equal to or smaller than a predetermined amount from the stream from the client (step S6), and writes the data to the stream to the server (step S7).

The above described TCP terminating device (application gateway) has a problem such that the global connectivity guarantee cannot be made for the following reasons.

(a) Many protocol-dependent application gateways make TCP termination only for a particular protocol. Therefore, an IP packet or a TCP stream does not flow with an unsupported application.

(b) Since a gateway that does not store end-to-end information makes TCP termination, the host of the gateway is misidentified as an end host as opposed to a partner end host. Namely, the end hosts cannot identify their counterparts mutually.

One of the important things to implement the TCP terminating device (application gateway) is that the information of a connection destination must be notified from a client host by some means or another.

As a specific example, http handling web data supports a communication via an application gateway referred to as a proxy. With http, the information of the IP address or the port number of a connection destination can be written.

However, since such a method is not supported by all of application protocols, it can be said that service scalability is significantly low.

In the meantime, there is a method using software (middleware) for a client host, which operates in coordination with an application gateway.

This software is intended to direct all TCP connections toward an application gateway, and, therefore, its service scalability is significantly improved in comparison with a normal proxy.

However, this software cannot cope with a protocol to be described below, according to which a connection is established in two stages, and a second connection is established in a reverse direction of a first connection.

Taken as a specific example is the use of a data transfer application ftp by an application gateway.

First of all, it is possible to establish a control session from a client to a server. However, attempts are unsuccessfully made to establish a data session, which makes a data transfer, from the server to the client. The reason why the first control session is established is that a stream flows in the direction from the client to the server.

However, the end host viewed from the server of the control session is a gateway. Although the server attempts to establish the data session toward the gateway, it fails in the attempts to establish the data session. This is because the gateway is not passive-open.

As far as ftp is concerned, this problem can be avoided by using the passive mode of the client software. However, other protocols that establish a connection in two stages exist, and service scalability is still problematic if a possible future increase in such protocols is considered.

As described above, reachability of an IP packet or a stream has a problem in an end-to-end connection on which a conventional TCP terminating device is arranged, and the end-to-end connectivity guarantee cannot be made.

A summary of one of the problems of the conventional TCP terminating device, that is, non-storage of end-to-end information, is shown in FIGS. 10A and 10B.

As shown in FIG. 10A, no change occurs in the information of the IP address and the port number within the IP packet header even if the packet passes through a normal IP router, as shown in FIG. 10A.

However, if an IP packet passes through the conventional TCP terminating device (actually, after the IP packet is once reconfigured into a stream, it is reassembled to a packet). As shown in FIG. 10B, the IP address and the port number of the IP packet replace the IP address and the port number of a gateway as a new end host.

Currently, many application gateways and NAT routers which perform the conversion between a private address and a global address provide, in order to avoid such a problem, the mechanism for respectively coping with each application protocol and for transmitting a TCP or a UDP packet from a server to a original client.

However, also with other application protocols, not a few cases exist in which the IP address of a client is obtained from the first session, and a TCP connection is established from a server to the client or a UDP packet is transmitted based on the obtained information. Furthermore, because the above described mechanism has a problem such that some measures must be taken each time a new application or protocol appears, it can be said that this mechanism is lack of service scalability.

SUMMARY OF THE INVENTION

The present invention was developed in the above described background, and aims at implementing an IP router device having a function for terminating a TCP connection which guarantees global connectivity important as one nature of the Internet while adopting the mechanism for terminating a TCP connection in order to make an efficient transmission in a TCP connection.

A router device according to the present invention is a router device having a function for linking a plurality of different IP networks and terminating a TCP connection. This router device comprises: a first converting unit rewriting part of the IP address information and the port number information within a plurality of IP packets according to a predetermined rule when the plurality of IP packets to be relayed, which form a TCP connection, pass through the router device; and a unit extracting information indicating an original connection destination of the TCP connection, generating a TCP connection from the router to the connection destination, and linking the two TCP connections with streams, and a second converting unit rewriting part of the IP address information and the port number information within the plurality of IP packets forming the TCP connection according to a predetermined rule for a TCP connection from the router to the connection destination, wherein the first and the second converting units handle the above described two TCP connections as a pair, assigns a unique identification number to the TCP connection pair, and manages the two TCP connections according to the unique identification number stored in the database.

According to the present invention, an IP router device guaranteeing the global connectivity which is important as one nature of the Internet while adopting the mechanism for terminating a TCP connection is realized to make an efficient transmission in the TCP connection straddling networks of different natures.

BRIEF DESCRIPTION OF THE DRAWINGS

FIG. 11 exemplifies the configuration of a device to which the present invention is applied;

FIG. 14 shows an input process of an IP stack according to the preferred embodiment of the present invention;

FIG. 17 shows the process flow of a converting function 1 according to the preferred embodiment of the present invention;

FIG. 18 shows the process flow of a converting function 2 according to the preferred embodiment of the present invention;

FIG. 19 shows the process flow of a converting function 3 according to the preferred embodiment of the present invention;

DESCRIPTION OF THE PREFERRED EMBODIMENTS

Figure 9:
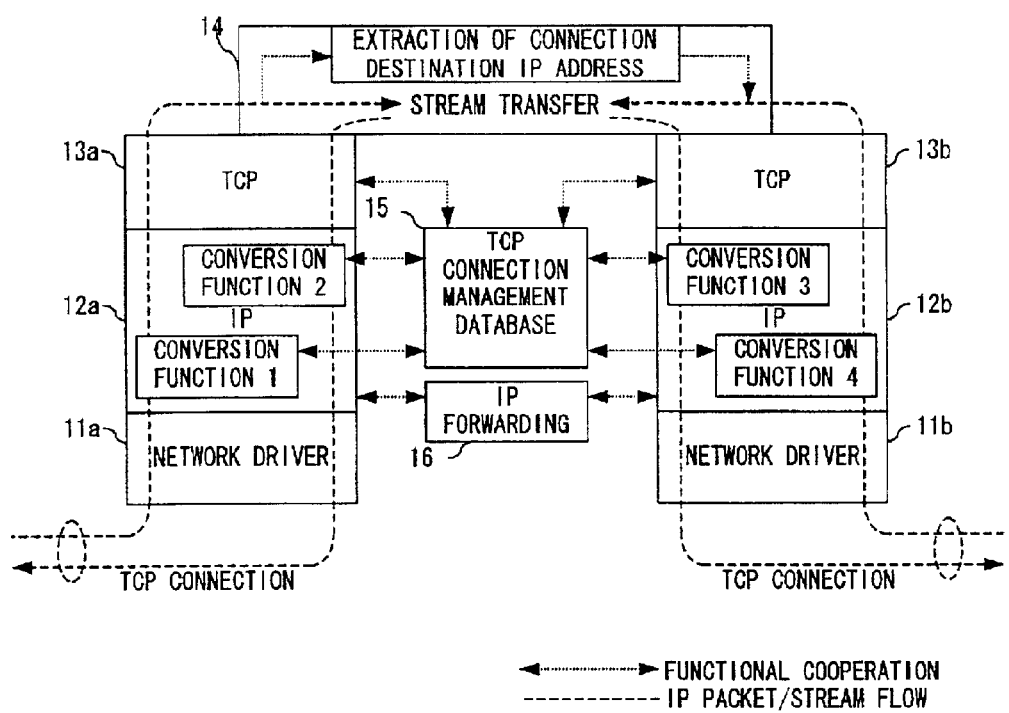
FIG. 9 explains the outline of the present invention.

FIG. 9 explains the outline of the present invention. In this FIGS. 11a and 11b indicate network drivers, 12a and 12b indicate IP stacks, 13a and 13b indicate TCP stacks, 14 indicates a stream transferring unit, 15 indicates a TCP connection management database, and 16 indicates an IP forwarding.

Figure 2:
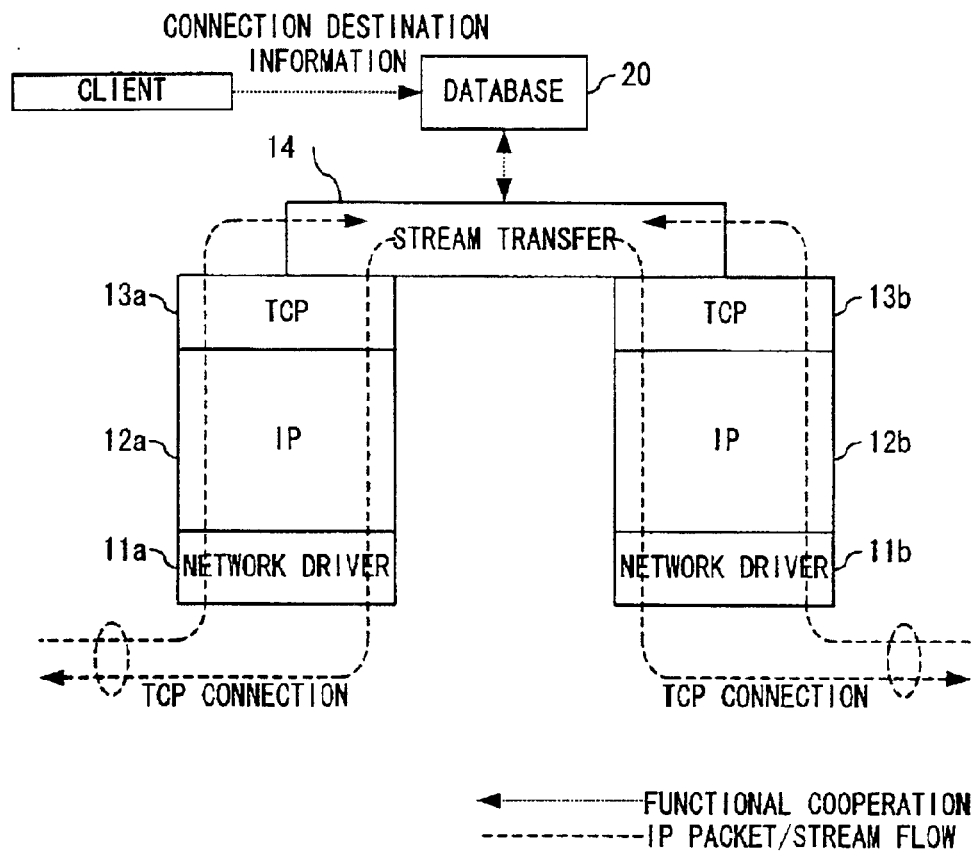
FIG. 2 shows the configuration of a conventional TCP terminating device.
Figure 3:
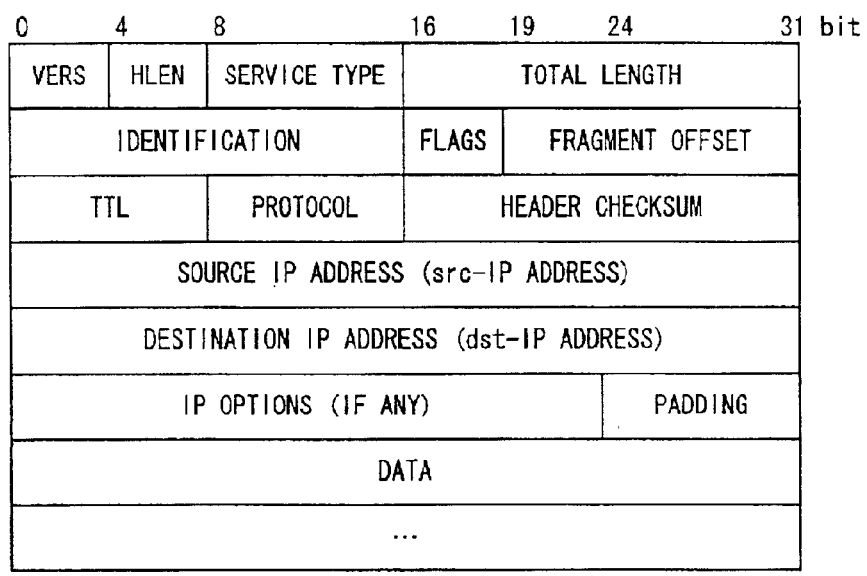
FIG. 3 shows the header configuration of an IP packet.
Figure 4:
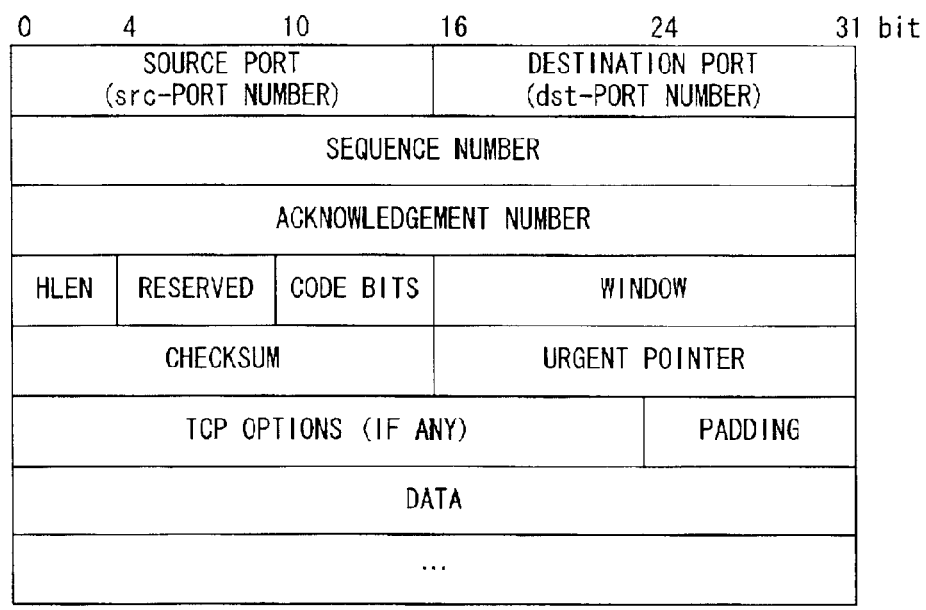
FIG. 4 shows the header configuration of a TCP packet.

Configuration of the fundamental portion of an IP router device according to the present invention is similar to that of a conventional application gateway. However, according to the present invention, the following points are added and modified in contrast to the conventional application gateway shown in FIG. 2.

(a) The point that units converting the information within a TCP/IP packet header (converting functions 1 through 4 shown in FIG. 9) in the IP stacks 12a and 12b, and a database for these functions (a TCP connection management database 15 shown in FIG. 9) are arranged.

(b) The point that a function for extracting the IP address and the port number of a TCP connection destination is arranged in the stream transferring unit 14.

The TCP/IP packet header information converting functions 1 through 4 exist respectively as the processes for input and output packets. These functions operate individually for the network drivers (network interfaces) 11a and 11b. Note that, however, the converting functions 1 through 4 cooperate with one another via the shared TCP connection management database 15, so that the processes are performed according to a unique conversion rule for one TCP connection.

The stream transferring unit 14 has the function for extracting the address and the port number of a TCP connection destination based on the information of a TCP connection with a client, unlike the conventional application gateway.

As shown in FIG. 9, the present invention overcomes the above described problems as follows.

(1) A router device that has a function for terminating a TCP connection and links a plurality of different IP networks is made to comprise: first converting units (conversion functions 1 and 2 shown in FIG. 9) rewriting part of the IP address information and the port number information within a plurality of IP packets according to a predetermined rule when the plurality of IP packets to be relayed, which form a TCP connection, pass through the router device; a stream transfer 14 in FIG. 9 extracting the information indicating an original connection destination of the TCP connection, generating a TCP connection from the router to the connection destination, and linking the two TCP connections with a stream; and second converting units (conversion functions 3 and 4) rewriting part of the IP address information and the port number information within a plurality of IP packets forming the TCP connection to the original connection destination, wherein the first and the second converting units handle the above described two TCP connections as a pair, store information needed for rewriting, which is related with an identification number, (entry or item of FIG. 13), by assigning a unique identification number to the pair, and manages the two TCP connections with the unique identification number stored in the database 15.

(2) In the above described (1), the first and the second converting units generate, delete, or update the information of IP addresses or TCP port numbers obtained from the database using an identification number as a retrieval key, stored in the database upon receiving the TCP connection termination notification from the TCP stack.

(3) In the above described (1) and (2), the first and the second converting units do not rewrite the information within IP packets other than a TCP packet, and route the packets to a predetermined network.

(4) In the above described (1), (2), and (3), the first and the second converting units do not rewrite the information within IP packets of a new TCP connection which exceeds a predetermined number of connections, and route the packets to a predetermined network.

(5) In the above described (1) through (4), the first and the second converting units rewrite the IP address information and the port number information, and part of the TCP/IP header information included in packet data for an ICMP packet which has header information of a predetermined type therein.

The router device may be configured in a way such that the above described first and second converting units and the unit linking connections with a stream assign one identification number to a TCP connection pair, and manage a plurality of TCP connection pairs. As a result, a plurality of TCP connections can be supported.

Figure 10A:
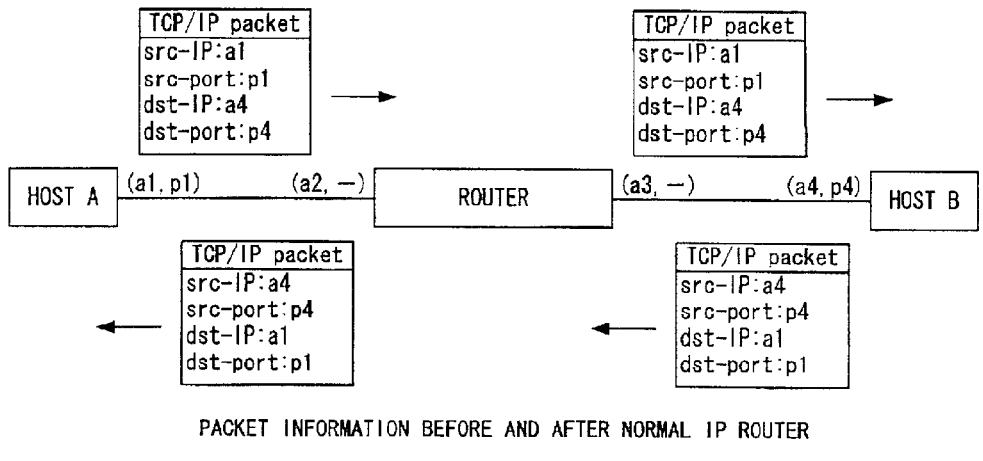
FIGS. 10A through 10C explain the information change of an IP packet after passing through a router and global connectivity.
Figure 10B:
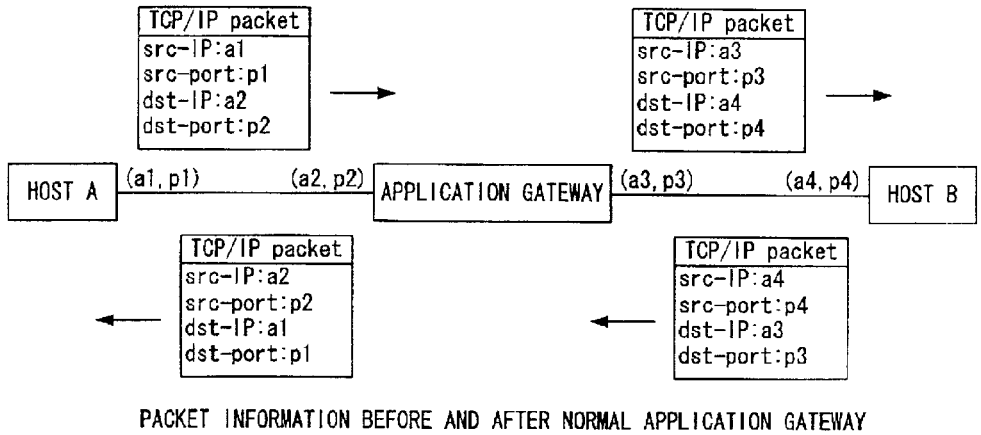
Figure 10C:
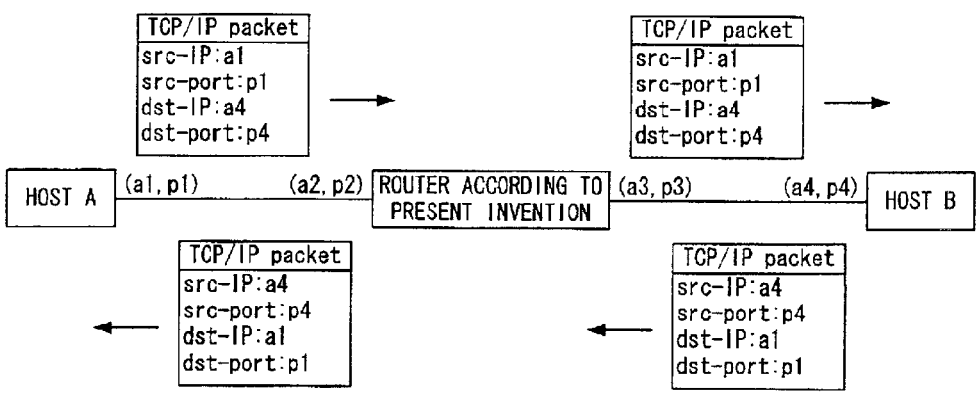

Packet information before and after a conventional IP router device, an IP router device according to the present invention, and a conventional application gateway are shown in FIGS. 10A through 10C.

FIG. 11A shows the information of the IP address and the port number within a packet header before and after the packet passes through the above described conventional IP router. This figure illustrates the characteristic such that no change occurs in the address and the port number information even if the packet passes through the router. This means the above described global connectivity guarantee.

FIG. 10B shows the information of an IP address and a port number within a packet header before and after the packet passes through the above described conventional application gateway. Here, the information within the packet header is proved to change at the application gateway as a boundary. Accordingly, the global connectivity cannot be guaranteed.

According to the present invention, no change occurs in the information of an IP address and a port number within a packet header although a TCP connection is terminated. Accordingly, both of end hosts can implement a TCP connection in exactly the same manner as in the conventional IP router. Consequently, the global connectivity is guaranteed.

FIG. 11 exemplifies the configuration where the present invention is implemented as a device.

Normally, software for implementing the functions of the present invention is stored in a main storage device 102 or an auxiliary storage device 103 in a general-purpose computer, and the processes according to the present invention are executed by a CPU 101. The device shown in FIG. 11 comprises two or more network interfaces 104, to which different networks are linked. As a network interface, not only Ethernet but also PPP on a serial line, etc. are available.

Figure 12:
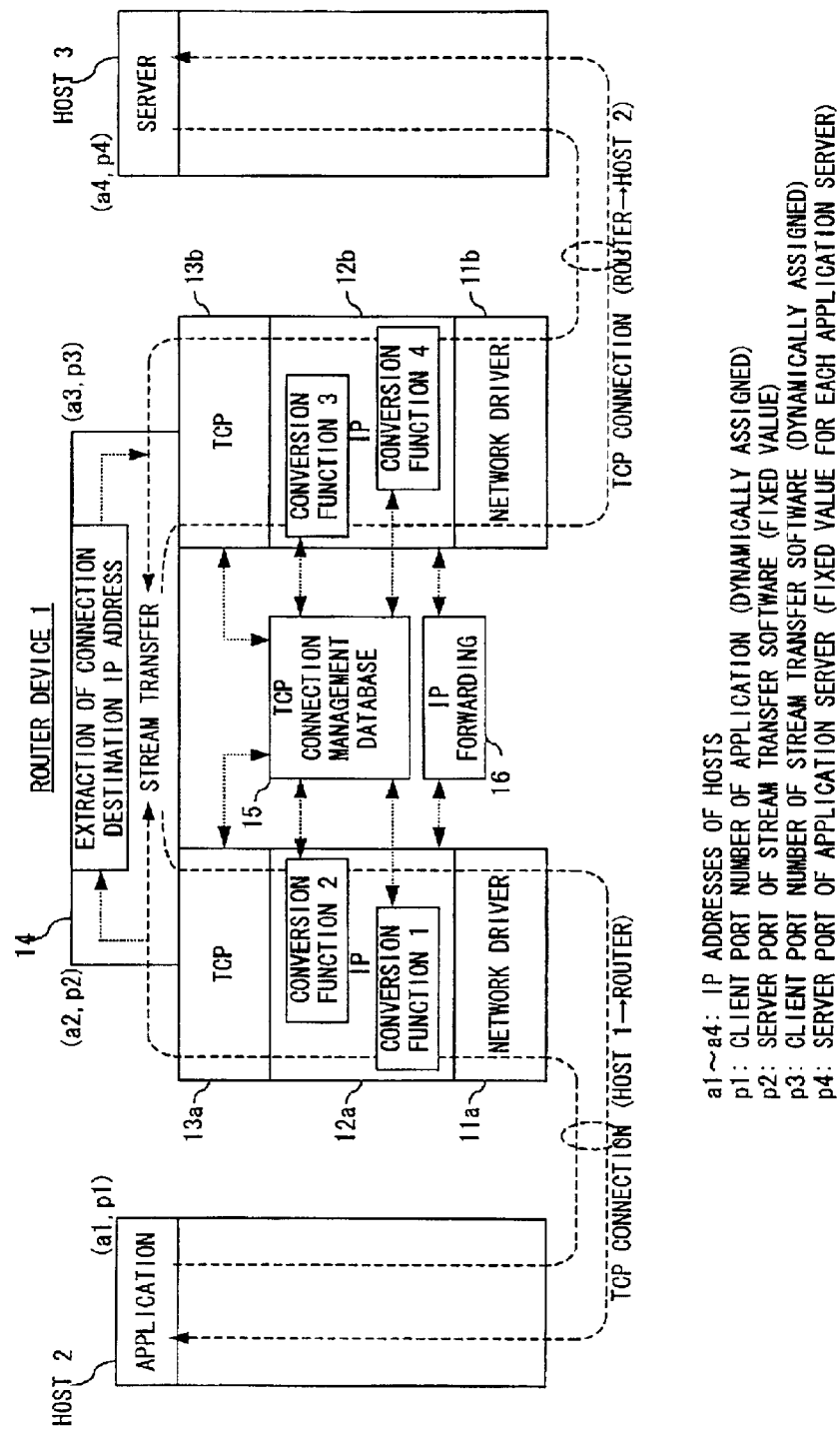
FIG. 12 shows the configuration of a router device according to a preferred embodiment of the present invention.

The configuration of an IP router device according to a preferred embodiment of the present invention is shown in FIG. 12.

The IP router device according to this preferred embodiment is mainly composed of two converting units converting the information within a packet header by managing the information of a TCP connection within an IP stack, and a unit linking two TCP connections on a stream level in the application layer.

In FIG. 12, host 2 and host 3 indicate hosts. Here, as shown in this figure, it is assumed that the IP address of a host 2 is a1, the (dynamically assigned) client port number of an application is p1, the TP address of a host 3 is a4, and the server port number (fixed value for each application server) of an application server is p4.

Router device 1 indicates the IP router device according to this preferred embodiment. As shown in FIG. 12, it is assumed that the IP addresses of the IP router are a2 and a3, the server port number (fixed value) of the stream transfer software is p2, and the (dynamically assigned) client port number of the stream transfer software is p3.

The IP router device 1 comprises network drivers 11a and 11b, IP stacks 12a and 12b, TCP stacks 13a and 13b, and a stream transferring unit 14 for linking two TCP connections with streams. The stream transferring unit 14 has a function for extracting the IP address of the original connection destination of a TCP connection.

Figure 1:
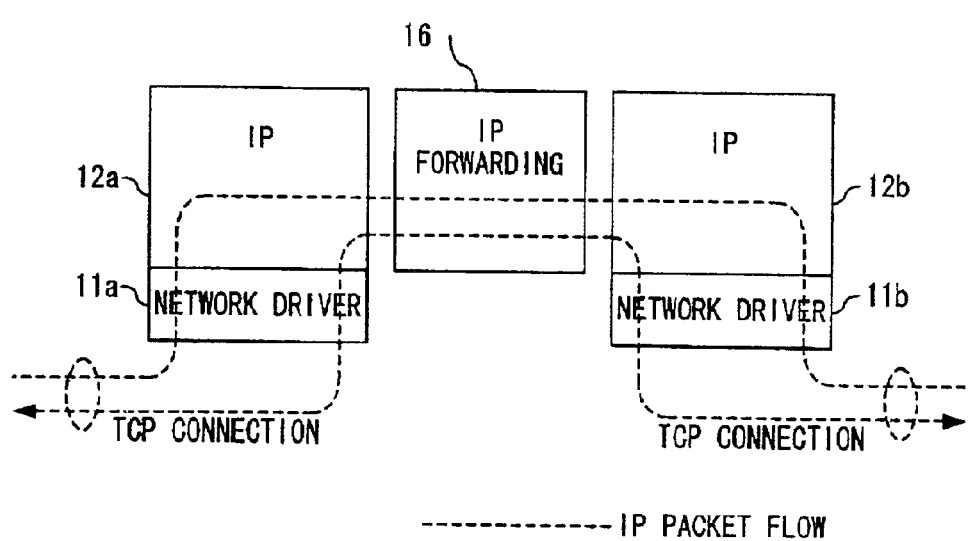
FIG. 1 shows the configuration of a conventional IP router device.

15 indicates a database for managing TCP connections. The IP stacks 12a and 12b convert a packet header in cooperation with the database 15. The IP forwarding 16 routes an IP packet, which is not regarded as a conversion target by the IP stack, in a similar manner as in the conventional router device shown in FIG. 1, as will be described later.

Figure 13:
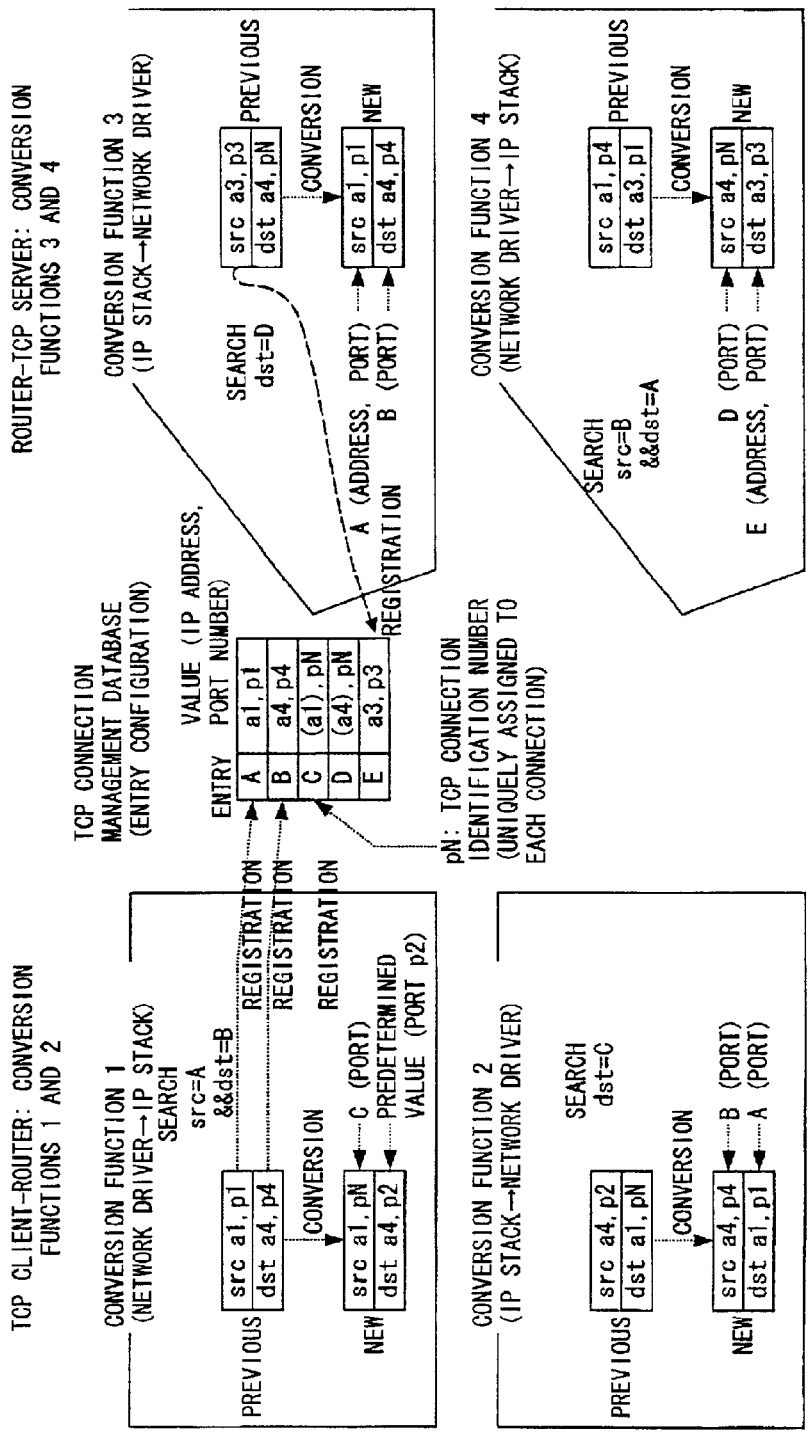
FIG. 13 explains conversion rules for information within an IP packet in the router device according to the preferred embodiment of the present invention.

FIG. 13 shows the functions for converting a packet header within the IP stack and their rules, and the cooperation between the TCP connection management database and the conversion functions.

In this figure, "a1" within "src a1, p1" indicates the IP address (src-IP) of a transmission source and "p1" indicates the port number (src-port number) of the transmission source, whereas "a4" within "dst a4, p4" indicates the IP address (dst-IP) of a connection destination and "p4" indicates the port number (dst-port number) of the connection destination. This figure also illustrates that "src a1, p1" and "dst a4, p4" are converted from "previous" to "new" respectively with the conversion functions 1 through 4.

Furthermore, "p2" indicates the server port number (fixed value) of the stream transfer software as described above, and "pN" indicates the identification number of a TCP connection, which is uniquely assigned to each connection.

The conversion rules shown in FIG. 13 indicate that no change occurs in the packet information (the IP address and the port number within a header) explained by referencing FIG. 10 when the router is externally viewed, and also indicate that and the stream transfer function can handle two terminated TCP connections when the router is viewed from its application layer. A series of the conversion functions is composed of the following processes.
(1) A process for an IP packet flowing from the network drivers 11a and 11b to the IP stacks 12a and 12b (the flow shown in FIG. 14)
(2) A process for an IP packet flowing from the IP stacks 12a and 12b to the network drivers 11a and 11b (the flow shown in FIG. 15)
(3) An entry deletion process of the TCP connection management database 15 (abbreviated to a management database hereinafter) (the flow shown in FIG. 16)

In the IP packet processes in the above described (1) and (2), the IP stacks 12a and 12b convert the IP address and the port number within the header of an IP packet with the conversion functions 1 through 4 shown in FIG. 13 (the flows shown in FIGS. 17 through 20).

It should be noted that the IP and the TCP stacks within the router are respectively separated into two for the sake of convenience in FIG. 12. However, according to this preferred embodiment, the IP and the TCP stacks are shared even if a plurality of interfaces exist. Accordingly, the above described packet process (1) includes the conversion functions 1 and 4. Similarly, the above described packet process (2) includes the conversion functions 2 and 3.

Figure 6:
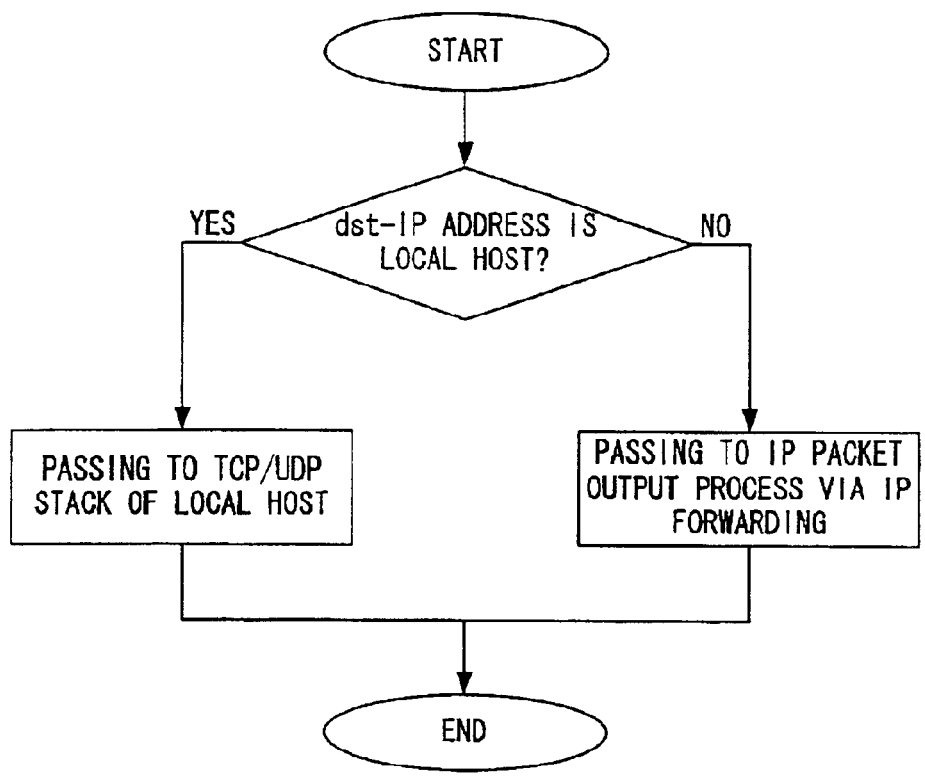
FIG. 6 shows the flow of an IP packet input process performed by the conventional IP router device.

As shown in FIG. 6, the conventional IP router judges the process for a flowing-in IP packet by determining whether or not the dst-IP address is the local host (router itself), and outputs an IP packet the dst-IP address of which is not the local host to a network via the IP forwarding (IP routing).

According to this preferred embodiment, TCP termination is made instead of this IP routing. If an IP packet the dst-IP address of which is not the local host is a TCP or an ICMP packet, the packet is made to pass through the conversion function 4 or 1 (the flow of FIG. 14 to be described later). With the respective conversion functions, the IP address and the port number of a packet registered to the TCP connection management database 15 as a target are converted as shown in FIG. 13, and the packet is passed to the TCP stack 13a or 13b within the router. A packet unregistered to the management database 15 is not regarded as a conversion target.

As will be described later, the conversion function 1 adds an entry to the database if an IP packet that is not regarded as a conversion target has an SYN flag (communication establishment request flag) of TCP, and if attempts are made to establish a new TCP connection. The conversion function 1 must be executed after the conversion function 4, in order to implement this new entry addition function.

The IP packet that is not regarded as a conversion target finally, that is, a UDP packet or a TCP packet which does not comply with some restriction or another (a connection number restriction to be described later, etc.) is routed via the IP forwarding 16, similar to the conventional IP router.

Figure 7:
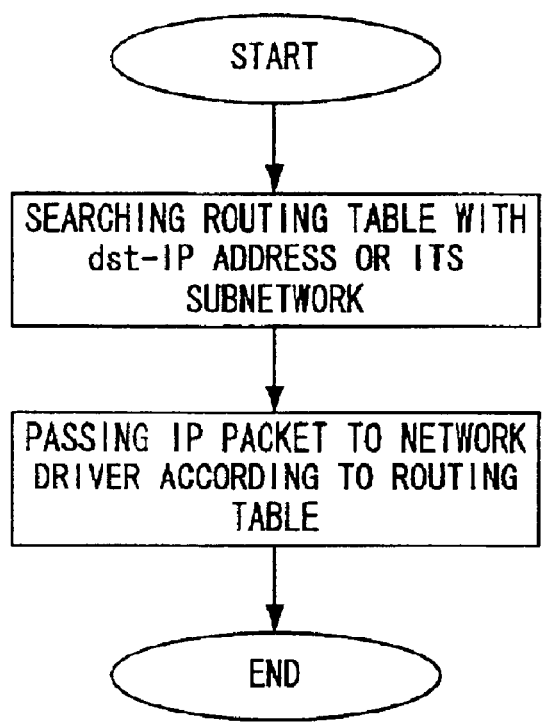
FIG. 7 shows the flow of an IP packet output process performed by the conventional IP router device.

With the process for a flowing-out IP packet, the conventional IP router searches a routing table for a network with a dst-IP address as shown in FIG. 7, and outputs the packet to the searched network.

Figure 15:
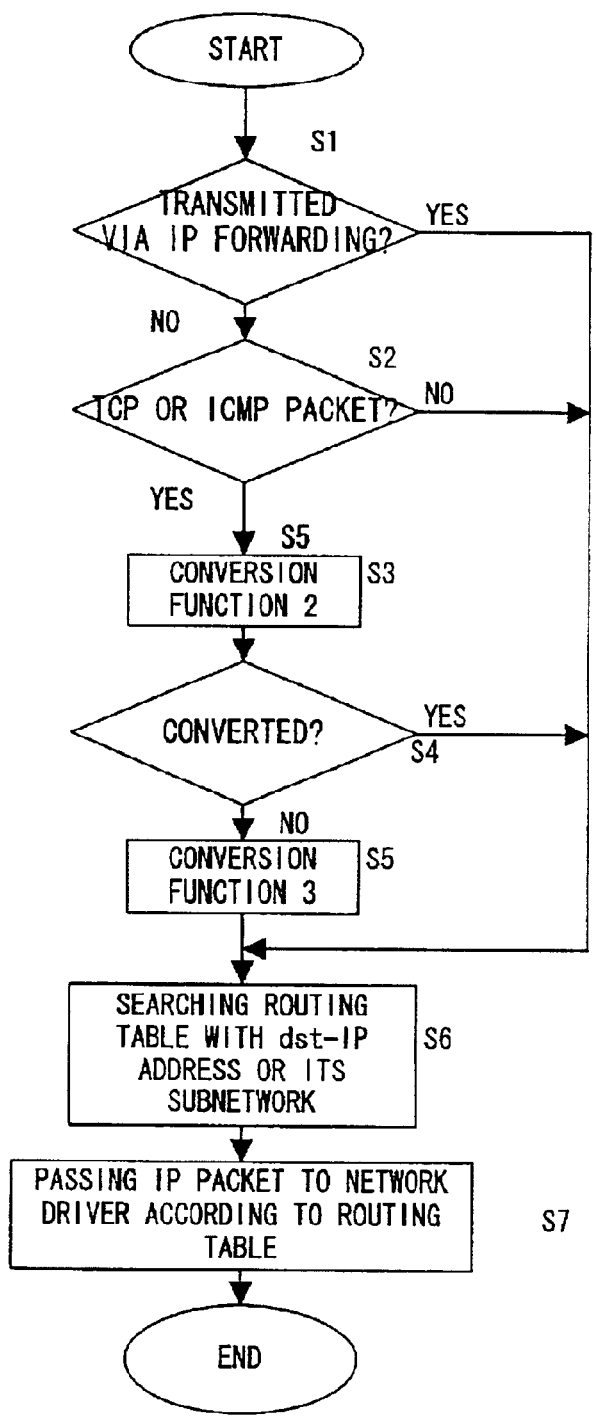
FIG. 15 shows an output process of the IP stack according to the preferred embodiment of the present invention.

According to this preferred embodiment, a packet other than a packet that is transmitted via the IP forwarding 16, that is, an IP packet passed from the application layer to the TCP/ICMP layer as a target is passed to the conversion function 2 or 3, which converts its IP address and port number as shown in FIG. 15. The packet is processed in a similar manner as in the conventional router after being converted, and output to the network.

The TCP connection management database 15 manages a TCP connection from its generation to its termination, and assigns a unique identification number (pN shown in FIG. 13) to each connection.

An entry managed by the management database 15 is composed of 5 items A through E as shown in FIG. 13. Each entry is newly generated the same time a new CP connection is detected by the conversion function 1, and assigned the items A through D.

With the conversion function 3, the item E is assigned as shown in FIG. 13. In this way, the conversion functions 1 through 4 can rewrite the IP address and the port number within a packet header in correspondence with a database entry.

Figure 16:
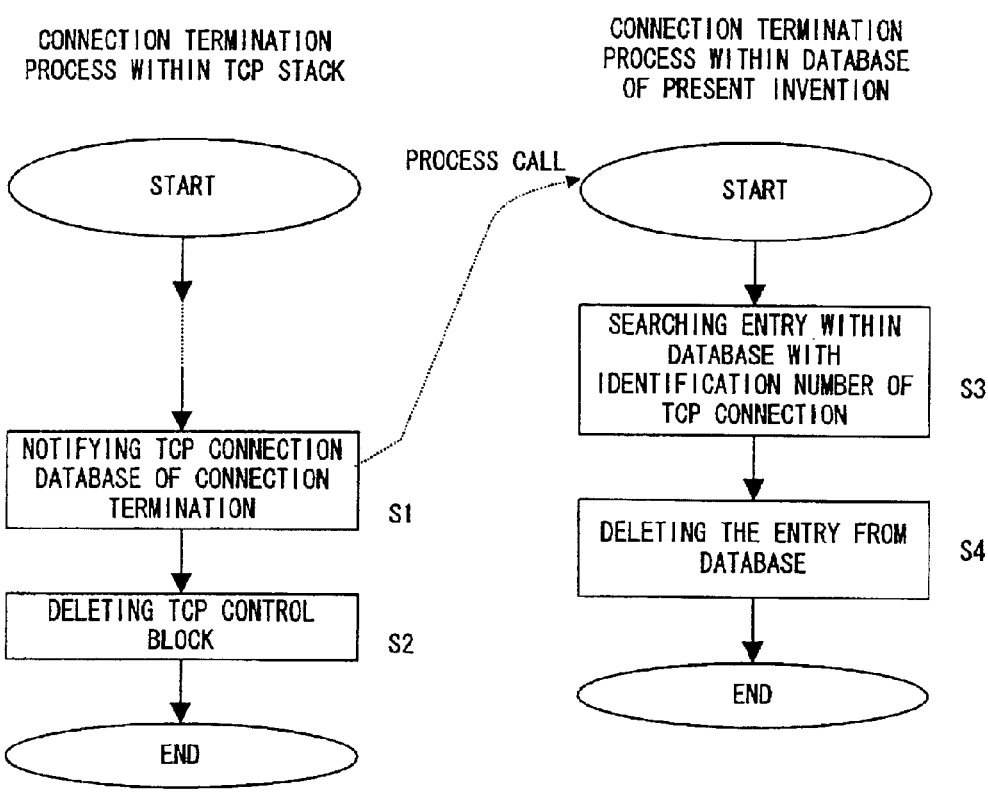
FIG. 16 shows the flow of an entry deletion process in a management database according to the preferred embodiment of the present invention.

An entry in the management database 15 is deleted by the TCP stack in synchronization with the closing of a TCP connection as shown in the flow of FIG. 16 to be described later. Namely, when a TCP connection is closed, the TCP stack calls a connection termination process routine within the management database 15 with the identification number of the TCP connection. This process routine searches a corresponding entry with the identification number, and deletes the entry from the database.

An entry for managing a connection within the management database 15 is newly generated when SYN (communication establishment request) of a TCP packet reaches, and deleted when being called from the closing process of the TCP stack as described above. This eliminates the need for tracking an entire TCP sequence for the existence of a connection [SYN (communication establishment request), FIN (termination request), and RST (forcible termination)] as in the operations of the TCP stack, thereby greatly simplifying the connection management process.

Figure 21:
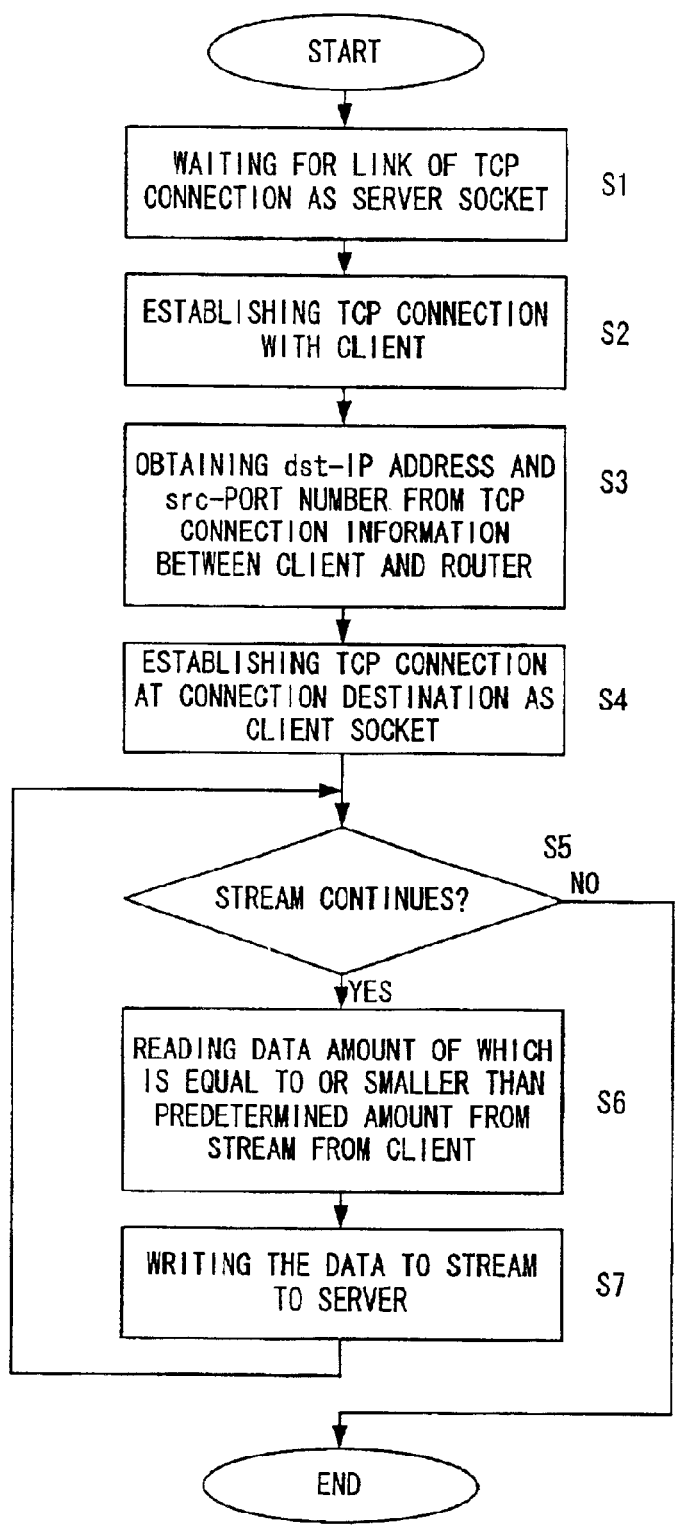
FIG. 21 shows the process flow of a stream transfer function according to the preferred embodiment of the present invention.

The stream transferring unit 14 makes a stream transfer as shown in the flow of FIG. 21 to be described later.

Figure 8:
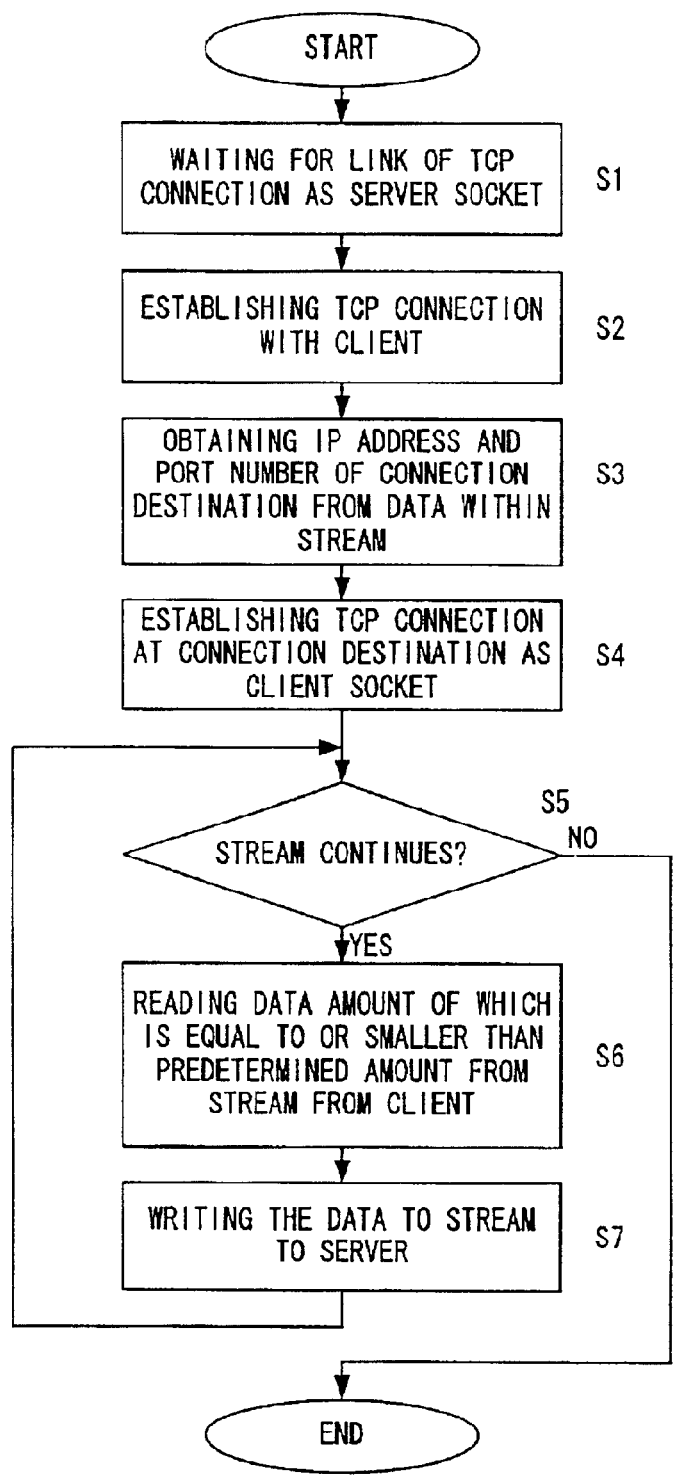
FIG. 8 is a flowchart showing a stream transfer function of the conventional TCP terminating device.

The difference between the typical stream transfer function for use in the conventional application gateway shown in FIG. 8 and the stream transfer function according to this preferred embodiment exists in a method obtaining the IP address and the port number of a server to be connected.

With the conventional application gateway, the information of the IP address and the port number are normally presented within a stream from a client. By way of example, for an http proxy which is one type of an application gateway, host information for obtaining an IP address "www.nic.ad.jp" and a port number "80" are written in its stream as follows.

GET/HTTP/1.0 (at the time of an end-to-end communication)

GET http://www.nic.ad.jp:80/HTTP/1.0 (when the proxy is used)

In contrast, according to this preferred embodiment, the information of an original connection destination ("dst a4" in FIG. 13) remains within an IP packet after the conversion function 1 as shown in FIG. 13. Therefore, the stream transfer function can obtain the IP address of the server to be connected by using a function for obtaining the connection destination information of a socket.

Since the port number is rewritten to the server port ("p2" in FIG. 13) of the server socket of the stream transfer function by the conversion function 1, the original value cannot be obtained from destination information of a socket with the stream transfer function. However, the identification number (pN in FIG. 13) of a TCP connection is set in the src-port number of the socket by the conversion function 1 as shown in FIG. 13. Therefore, this is used as the port number of the TCP connection to the server.

The information of the port number is rewritten to the port number ("p4" in FIG. 13) of the server being the original connection destination when a TCP packet passes through the conversion function 3, as shown in FIG. 13. With the conversion function 3, not only the dst-port number but also the src-IP address and the src-port number are rewritten. Therefore, even if the stream transfer function uses a client socket that assigned a dynamic port number, the original IP address and the port number, which are assigned by the original client, can be viewed from the server in which the client is to be accommodated.

The above described process is explained by referencing the flowcharts shown in FIGS. 14 through 21.

FIG. 14 shows the IP packet input process performed by the IP stack in the above described (1).

When an IP packet flows from the network driver to the IP stack, the IP stack determines whether or not the dst-IP address is its local host (step S1). If the dst-IP address is its local host, the IP stack passes the packet to the TCP/IP stack of the local host (step S2). Here, the process is terminated. If the dst-IP address is not the local host, the IP stack determines whether the packet is either a TCP or an ICMP packet (step S3). If the packet is nether a TCP nor an ICMP packet, the IP stack passes the packet to the IP packet output process via the IP forwarding 16.

If the IP packet is either a TCP or an ICMP packet, the process proceeds to step S5where the IP address and the port number within the TCP/IP packet are converted with the conversion function 4 (the flow of FIG. 20 to be described later), for example, as shown in the conversion function 4 of FIG. 13. Then, it is determined whether or not the IP address and the port number are converted (step S6). If it is determined that the IP address and the port number are converted, the packet is passed to the TCP/IP stack of the local host (step S2). Here, the process is terminated.

If it is determined that the IP address and the port number are not converted, the IP address and the port number within the TCP/IP packet are converted with the conversion function 1 (the flow of FIG. 17), for example, as shown in the conversion function 1 of FIG. 13. Then, it is determined whether or not the IP address and the port number are converted (step S8). If the IP address and the port number are not converted, the packet is passed to the IP packet output process via the IP forwarding 16 (step S4). If the IP address and the port number are converted, the packet is passed to the TCP/IP stack of the local host (step S2). Here, the process is terminated.

FIG. 15 shows the IP packet output process performed by the IP stack in the above described (2).

When an IP packet flows into the IP stack, the IP stack determines whether or not the packet is reached via the IP forwarding 16 (step S1). If the IP packet is reached via the IP forwarding 16, the process proceeds to step S6where the IP stack searches a routing table with the dst-IP address or its subnetwork (step S6), and passes the IP packet to the network driver according to the routing table.

If the IP packet is not reached via the IP forwarding 16, the IP stack determines whether the packet is either a TCP or an ICMP packet (step s2). If the packet is neither a TCP nor an ICMP packet, the process proceeds to step S6 where the above described process is performed.

If the IP packet is either a TCP or an ICMP packet, the IP address and the port number within the TCP/IP packet are converted with the conversion function 2 (the flow shown in FIG. 18), for example, as shown in the conversion function 2 of FIG. 13 (step S3). Then, it is determined whether or not the IP address and the port number are converted (step S4). If the IP address and the port number are converted, the process proceeds to step S6. If the IP address and the port number are not converted with the conversion function 2, the IP address and the port number within the TCP/IP packet are converted with the conversion function 3 (the flow of FIG. 19) (step S5). The process then proceeds to step S6 where the routing table is searched with the dst-IP address or its subnetwork (step S6), and the IP packet is passed to the network driver according to the routing table.

FIG. 16 shows the entry deletion process in the management database 15 in the above described (3).

Upon termination of a connection within the TCP stack, the connection termination process within the TCP stack notifies the management database 15 that the connection is terminated (step S1). As a result, the connection termination process within the management database 15 is called. The connection termination process searches the database for a corresponding entry with the identification number (the above described "pN") of the TCP connection (step S3), and deletes the entry from the database (step S4).

In the meantime, the connection termination process within the TCP stack deletes the TCP control block (step S2).

FIG. 17 shows the process performed by the above described conversion function 1. The src-IP address, the src-port number, the dst-IP address, and the dst-port number within a TCP/IP packet flowing from the network driver into the IP stack are converted with the conversion function 1 as follows.

First of all, in step S1, entries within the management database 15 are searched, and it is determined whether or not an entry including the src-IP address within the TCP/IP packet, which matches the IP address of the item A (see FIG. 13) within the management database 15, the src-port number which matches the port number of the item A, the dst-IP address which matches the IP address of the item B, and the dst-port number which matches the port number of the item B, exists.

If the above described entry does not exist in the management database 15, the process proceeds from step S2 to step S3 where it is determined whether or not a connection to be processed complies with a restriction on the number of connections. If the connection to be processed does not comply with the restriction on the number of connections, the process is terminated. In this case, the packet is passed to the IP packet output process via the IP forwarding 16.

If the connection to be processed complies with the restriction on the number of connections, as to generation of entries, first the number of connections is checked, then step S3a is conducted to check if establishment of TCP connection is required. If the establishment of TCP connection is required, process goes to step S4, otherwise process terminates, thereby TCP connection generation by TCP stack is synchronized with generation of entries for address rewriting. In step S4, a new entry is generated in the management database 15, and the src-IP address and the src-port number are registered to the item A within the above described entry (step S5). Besides, the dst-IP address and the dst-port number are registered to the item B within the entry (step S6). For example, in FIG. 13, "a1, p1" and "a4, p4" are respectively registered to the items A and B.

Additionally, duplicates of the items A and B are registered to the IP addresses of the items C and D within the entry respectively. Furthermore, the identification number of the TCP connection is registered to the port number (step S7). For example, in FIG. 13, "pN" is registered to the port numbers of the items C and D.

Then, the port number of the item C is set in the src-port number within the TCP/IP packet (step S8), and the server port number of the stream transfer software is set in the dst-port number within the TCP/IP packet (step S9). Then, checksum of the IP packet is recalculated (step S10), and the process is terminated.

Or, if it is determined that the entry satisfying the condition of step S1 exists in step S2, the process proceeds to step S8. The operations in steps S8 to S10 are repeated.

With the above described process, for example, in FIG. 13, "a1" and "pN" are respectively in the src-IP address and the src-port number, whereas "a4" and "p2" are respectively set in the dst-IP address and the dst-port number, as shown in "new" of the conversion function 1 shown in FIG. 13.

FIG. 18 shows the process performed by the above described conversion function 2. The src-IP address, the src-port number, the dst-IP address, and the dst-port number within a TCP/IP packet flowing from the IP stack to the network driver are converted with the conversion function 2 as follows.

First of all, in step S1, entries in the management database 15 are searched, and it is determined whether or not an entry including the dst-IP address within a TCP/IP packet which matches the IP address of the item C within the management database 15, and the dst-port number which matches the port number of the item C, exists (step S2).

If the above described entry does not exist in the management database 15, the process is terminated. If the entry exists, the process proceeds from step S2 to step S3 where the port number of the item B is set in the src-port number within the TCP/IP packet, and the port number of the item A is set in the dst-port number within the TCP/IP packet (step S4). Then, checksum of the IP packet is recalculated (step S5), and the process is terminated.

With the above described process, for example, as shown in "new" of the conversion function 2 of FIG. 13, "a4" and "p4" are respectively set in the src-IP address and the src-port number, whereas "a1" and "p1" are respectively set in the dst-IP address and the dst-port number.

FIG. 19 shows the process performed by the above described conversion function 3. The src-IP address, the src-port number, the dst-IP address, and the dst-port number within a TCP/IP packet flowing from the IP stack to the network driver are converted with the conversion function 3 as follows.

First of all, in step S1, entries within the management database 15 are searched, and it is determined whether or not an entry including the dst-IP address within the TCP/IP packet which matches the IP address in the item D within the management database 15, and the dst-port number which matches the port number of the item D, exists.

If the above described entry does not exist in the management database 15, the process is terminated. If the entry exists, the process proceeds from step S2 to step S3 where the IP address of the item A is set in the src-IP address within the TCP/IP packet (step S3). Then, the port number of the item A is set in the src-port number within the TCP/IP packet (step S4), and the port number of the item B is set in the dst-port number within the TCP/IP packet (step S5). Then, the checksum of the IP packet is recalculated (step S6).

Next, it is determined whether or not the above described entry has been registered to the item E (step S7). If the entry has not been registered, the src-IP address and the src-port number are registered to the item E of the entry (step S8), and the process is terminated.

With the above described process, for example, as shown in "new" of the conversion function 3 shown in FIG. 13, "a1" and "p1" are respectively set in the src-IP address and the src-port number, whereas "a4" and "p4" are respectively set in the dst-IP address and the dst-port number. Additionally, "a3, p3" is registered to the item E of the management database 15.

Figure 20:
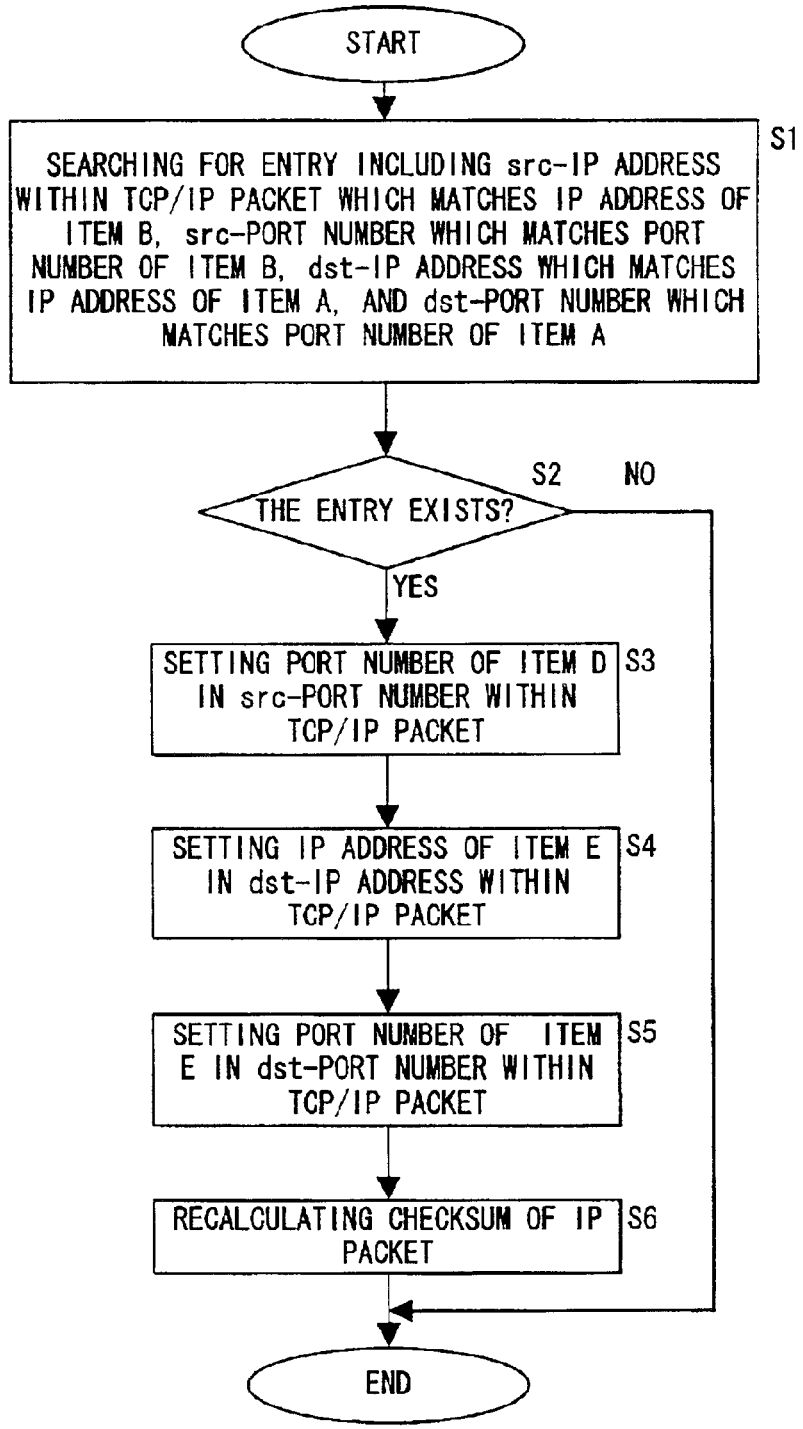
FIG. 20 shows the process flow of a converting function 4 according to the preferred embodiment of the present invention.

FIG. 20 shows the process performed by the above described conversion function 4. The src-IP address, the src-port number, the dst-IP address, and the dst-port number within a TCP/IP packet flowing from the network driver to the IP stack are converted with the conversion function 4 as follows.

First of all, in step S1, entries in the management database 15 are searched, and it is determined whether or not an entry including the src-IP address within the TCP/IP packet which matches the IP address in the item B within the management database 15, the src-port number which matches the port number of the item B, the dst-IP address which matches the IP address of the item A, and the dst-port number which matches the port number of the item A, exists.

If the above described entry does not exist in the management database 15, the process is terminated. If the entry exists, the process proceeds from step S2 to step S3 where the port number of the item D is set in the src-port number within the TCP/IP packet (step S3). Then, the IP address of the item E is set in the dst-IP address within the TCP/IP packet (step S4), and the port number of the item E is set in the dst-port number within the TCP/IP packet (step S5). Then, the checksum of the IP packet is recalculated (step S6), and the process is terminated.

With the above described process, for example, as shown in "new" of the conversion function 4 in FIG. 13, "a4" and "pN" are respectively set in the src-IP address and the src-port number, whereas "a3" and "p3" are respectively set in the dst-IP address and the dst-port number.

FIG. 21 shows the process flow of the above described stream transfer function.

The stream transfer function according to this preferred embodiment is similar to the conventional stream transfer function shown in FIG. 8. As described above, the stream transfer function according to this preferred embodiment obtains the IP address of the server to be connected by using the function for obtaining the connection destination information of a socket.

Namely, as shown in the flow of FIG. 21, the stream transfer function waits for the link of a TCP connection as a server socket (step S1), and establishes the TCP connection with a client (step S2). Then, the stream transfer function obtains the dst-IP address and the src-port information from the TCP connection information between the client and the router (step S3), and establishes the TCP connection at the connection destination as a client socket (step S4).

Then, the stream transfer function determines whether or not the stream continues (step S5). If the stream does not continue, the process is terminated. If the stream continues, the stream transfer function reads data the amount of which is equal to or smaller than a predetermined amount from the stream to the client (step S6), and writes the data to the stream from the server.

The above provided explanation refers to the preferred embodiment for fundamentally implementing a single end-to-end TCP connection. However, a plurality of TCP connections can be supported by managing a plurality of entries in the database and by uniquely assigning an identification number assigned to a TCP connection to TCP connections the number of which complies with a restriction on the number of managed TCP connections.

The identification number of a TCP connection is incremented by 1 from its initial value (such as 1024, etc.). If this number exceeds the range of the number of managed TCP connections, it is reset to an initial value when reaching a predetermined number. If the identification number to be used is already in use at this time, it is further incremented by 1.

With the conventional application gateway, packet routing in the IP layer is not performed. Accordingly, dedicated processes are required for IP packets such as UDP, ICMP packets, etc. other than a TCP packet. The router device according to the present invention comprises the mechanism for passing only a TCP packet (the mechanism for transmitting an ICMP packet will be described later) to the TCP layer within the router. Therefore, the other IP packets are routed similar to the conventional IP router. Accordingly, the global connectivity is guaranteed for a connection other than a TCP connection.

Additionally, the conventional application gateway requires a buffer for controlling TCP. Therefore, as the number of connections grows, a used memory amount increases. Since this is larger than the used memory amount of normal IP routing, an unlimited number of TCP terminations leads to much consumption of system memory. As a result, a disadvantage that the price of the device is increased is caused.

With the router device according to this preferred embodiment, the number of connections is managed for each src-IP address in the database, as shown in the conversion function 1 that is explained by referencing FIG. 17. When attempts are made to generate an entry for a new connection, the comparison between a predetermined restriction number and the number of currently managed connections is made. If the number of currently managed connections exceeds the restriction number, a new entry is not generated. All of IP packets thereafter are to be forwarded in the IP layer by the similar manner to the conventional router.

This achieves the effect of preventing the system performance from being degraded or stopped with a temporary or steady increase in the number of connections. Furthermore, the memory amount or the CPU performance required to design the device can be stipulated.

In this preferred embodiment, also a predetermined ICMP packet is terminated within the router device according to this preferred embodiment. Here, the predetermined ICMP packet is a packet including a TCP header in its data portion. To be more specific, ICMP header types 3 through 5, 11 and 12 are targeted as shown in FIG. 5.

Figure 5:
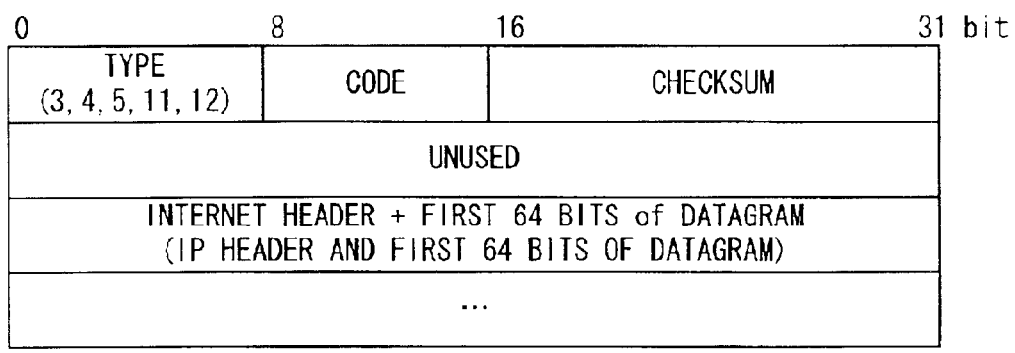
FIG. 5 shows the header configuration of an ICMP packet.

Namely, the ICMP packet has a packet header shown in FIG. 5, stores an IP header and its upper layer (such as TCP layer, etc.) header in its data portion, and transmits these information. If an error occurs when a packet passes through the router device according to this preferred embodiment from a host A and reaches a different router or a host at an end point, the error is notified to a packet transmission host with an ICMP packet in some cases.

At that time, part of the IP packet that causes the error is directly inserted in the data portion of the ICMP packet. An error occurring in an IP packet configuring a TCP connection must be notified to the host which actually terminates the TCP connection (here, the router device according to this preferred embodiment).

The reason is that the information of a sequence number included in the TCP header that is inserted in the ICMP data portion is different in the two TCP connections split by the router device according to this preferred embodiment, and an information inconsistency arises due to the notification with an ICMP packet.

Figure 22:
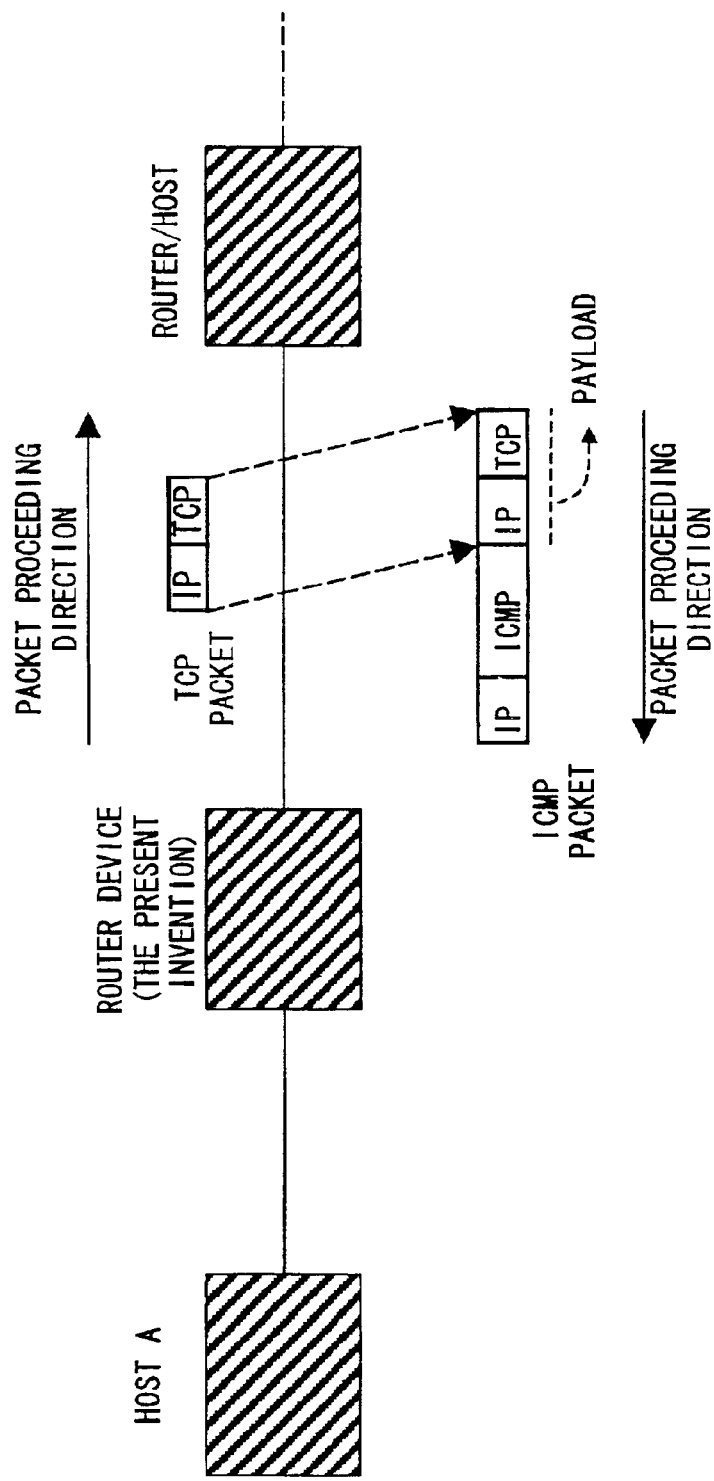
FIG. 22 explains IP packet generation and payload information reversing.

However, since the router device according to this preferred embodiment performs the operation for guaranteeing the global connectivity for the hosts at both ends, the host which generates an ICMP packet (or a router device) attempts to transmit the packet to the host A shown in FIG. 22.

Therefore, according to the present invention, not only a TCP connection but also a predetermined ICMP packet is terminated within the router device according to the present invention.

To terminate the ICMP packet (that is, to perform header conversion), an entry search using a connection is required similar to a normal ICMP packet. Note that, however, the proceeding direction of the ICMP packet and that of the TCP packet included in the data portion of the ICPM packet are reverse as shown in FIG. 22. Therefore, a search and a conversion must be performed after the src and dst information within the IP and the TCP headers in the data portion are reversed.

These information are restored to their originals after being converted. During this conversion, also the dst-IP address within the header of the IP packet included in the ICMP packet is converted similar to the dst-IP address within the IP header included in the ICMP data portion after being reversed.

Figure 23:
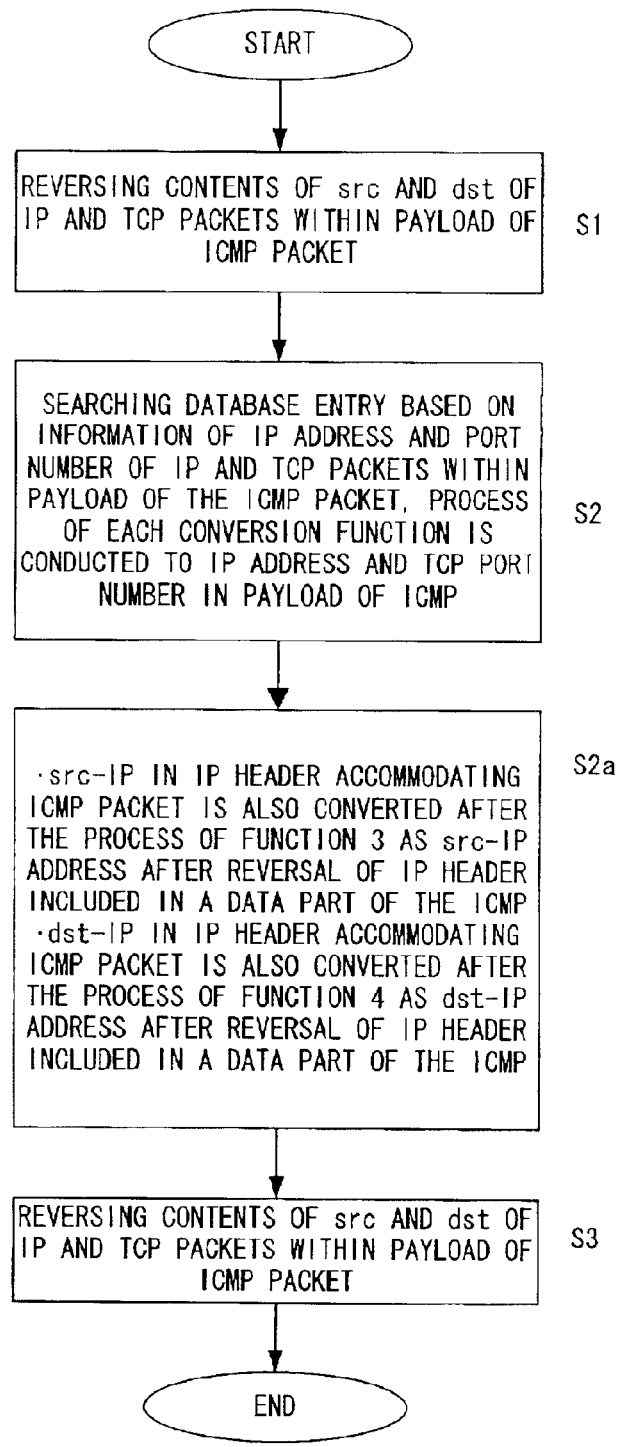
FIG. 23 shows the flow of an ICMP packet conversion process according to the preferred embodiment of the present invention.

The process for an ICMP packet is shown in FIG. 23.

In this figure, contents of the src and the dst information of the IP and the TCP packets included in the payload (data portion) of the ICMP packet are reversed (step S1). Then, entries in the management database 15 are searched based on the information of the IP address and the port number of the IP and the TCP packets within the payload (data portion) of the ICMP packet. Then, the process of each function is conducted to the IP address and TCP port number of payload of ICMP in step S2. In step 2a, src-IP in the IP header accommodating ICMP packet is also converted after the process of the function 3 as src-IP address after reversal of IP header included in a data part of the ICMP and dst-IP in the IP header accommodating ICMP packet is also converted after the process of the function 4 as dst-IP address after reversal of IP header included in a data part of the ICMP.

Next, the contents of the src and the dst information of the IP and TCP packets within the payload (data portion) of the ICMP packet are reversed.

As described above, according to the present invention, an IP router device that guarantees global connectivity which is important as one nature of the Internet while adopting a TCP termination mechanism in order to make an efficient transmission in a TCP connection straddling networks of different natures.

What is claimed is:

1. An IP router device, which has a function for terminating a TCP connection and for connecting a plurality of different IP networks, comprising:

a first converting unit rewriting part of IP address information and port number information within a plurality of IP packets when the plurality of IP packets to be relayed, which form a TCP connection, pass through the router device;

a unit extracting information indicating an original connection destination of the TCP connection, generating a TCP connection from the router to the connection destination, and linking the two TCP connections with streams; and a second converting unit rewriting part of IP address information and port number information within a plurality of IP packets forming a TCP connection for the TCP connection to the original connection destination, wherein said first and said second converting units handle the two TCP connections as a pair, store information needed for rewriting, which is related with a identification number, in a database by assigning a unique identification number to the pair, and manages the two TCP connections with the unique identification number stored in the database.

2. The IP router device according to claim 1, wherein said first and said second converting units generate, delete, or update information of IP address or TCP port number stored in the database upon receipt of TCP connection termination notification from a TCP stack.

3. The router device according to claim 1, wherein said first and said second converting units route an IP packet other than a TCP packet to a predetermined network without rewriting information within the IP packet.

4. The IP router device according to claim 1, wherein said first and said second converting units route an IP packet of a new TCP connection, which exceeds a predetermined number of connections, to a predetermined network without rewriting information within the IP packet.

5. The IP router device according to claim 1, wherein said first and said second converting units rewrite IP address information and port number information of an ICMP packet, and part of TCP/IP header information included in TCP/IP header information included in packet data for the ICMP packet having a predetermined type as header information within the packet.

6. A storage medium on which is recorded a program for causing an information processing device to execute a process for terminating a TCP connection and for linking a plurality of different IP networks, the process comprising:

rewriting part of IP address information and port number information within a plurality of IP packets when the plurality of IP packets to be relayed, which form a TCP connection, pass through a router device;

extracting information indicating an original connection destination of the TCP connection, generating a TCP connection from the router to the connection destination, and linking the two TCP connections with streams; and rewriting part of IP address information and port number information within a plurality of IP packets forming a TCP connection for the TCP connection to the original connection destination; and handling the two TCP connections as a pair, storing information needed for rewriting, which is related with a identification number, in a database by assigning a unique identification number to the pair, and managing the two TCP connections with the unique identification number stored in the database.

* * * * *